United States Patent
Hosoda

(10) Patent No.: US 11,368,062 B2
(45) Date of Patent: Jun. 21, 2022

(54) ROTOR STRUCTURE AND ROTOR STRUCTURE MANUFACTURING METHOD

(71) Applicant: FANUC CORPORATION, Yamanashi (JP)

(72) Inventor: Akihiro Hosoda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 234 days.

(21) Appl. No.: 16/781,027

(22) Filed: Feb. 4, 2020

(65) Prior Publication Data
US 2020/0251945 A1 Aug. 6, 2020

(30) Foreign Application Priority Data

Feb. 6, 2019 (JP) .............................. JP2019-019797

(51) Int. Cl.
*H02K 1/27* (2022.01)
*H02K 15/03* (2006.01)
*H02K 1/276* (2022.01)

(52) U.S. Cl.
CPC ........... *H02K 1/2773* (2013.01); *H02K 15/03* (2013.01)

(58) Field of Classification Search
CPC .... H02K 1/2773; H02K 15/03; H02K 1/2766; H02K 1/276; H02K 1/28
See application file for complete search history.

(56) References Cited

U.S. PATENT DOCUMENTS

| 2013/0241340 | A1* | 9/2013 | Koga ................... | H02K 1/2773 310/156.56 |
| 2021/0018227 | A1* | 1/2021 | Shimokawa ............. | F25B 1/04 |

FOREIGN PATENT DOCUMENTS

| JP | H03-036945 A | 2/1991 |
| JP | H06-044382 U | 6/1994 |
| JP | 2010-226785 A | 10/2010 |
| JP | 2014-039424 A | 2/2014 |
| WO | 2018/189881 A1 | 10/2018 |

OTHER PUBLICATIONS

An Office Action; "Notice of Reasons for Refusal", mailed by the Japanese Patent Office dated Jun. 8, 2021, which corresponds to Japanese Patent Application No. 2019-019797 and is related to U.S. Appl. No. 16/781,027; with English language translation.

* cited by examiner

*Primary Examiner* — Thomas Truong
(74) *Attorney, Agent, or Firm* — Studebaker & Brackett PC

(57) ABSTRACT

A rotor structure and a rotor structure manufacturing method capable of suppressing magnetic flux leakage and exhibiting an excellent torque-up effect are provided. A rotor structure includes: a plurality of rotor cores and; a plurality of magnets provided in the rotor cores and by being inserted into a plurality of magnet insertion holes formed so as to penetrate in the direction of an axis line; and a shaft provided integrally with the rotor cores by being inserted into center holes of the rotor cores, wherein the rotor cores include a first rotor core in which a diameter of the center hole is approximately equal to an outer diameter of the shaft and a second rotor core in which a diameter of at least a portion of the center hole is larger than the outer diameter of the shaft and which is arranged so as to be sandwiched between two first rotor cores on the same axis, and a magnet containing material is provided in a gap between an outer circumferential surface of the shaft and an inner circumferential edge of the second rotor core.

7 Claims, 9 Drawing Sheets

ROTOR STRUCTURE AND ROTOR STRUCTURE MANUFACTURING METHOD

This application is based on and claims the benefit of priority from Japanese Patent Application No. 2019-019797, filed on 6 Feb. 2019, the content of which is incorporated herein by reference.

BACKGROUND OF THE INVENTION

Field of the Invention

The present invention relates to a rotor structure and a rotor structure manufacturing method.

Related Art

For example, a rotor (a rotor structure) of an electric rotating machine such as a motor of an automobile or an electric appliance is formed by integrally assembling a plurality of rotor cores 1 in the direction of an axis line O1 while inserting a shaft 2 into center holes (shaft holes) 1a of the rotor cores 1 as shown in FIGS. 13, 14, and 15. Moreover, an IPM-type rotor core (an interior permanent magnet type rotor core) and an SPM-type rotor core (a surface permanent magnet type rotor core) are often used as the rotor core 1.

An IPM-type rotor core 1 includes, for example, a laminated iron core 3 obtained by laminating a plurality of core members (thin plate-shaped members) formed by punching an electromagnetic steel sheet, a permanent magnet 4 inserted and accommodated in a magnet insertion hole 3c formed so as to penetrate from one end 3a in the direction of the axis line O1 of the laminated iron core 3 to the other end 3b, and a resin material 5 injected into the magnet insertion hole 3c so that the permanent magnet 4 is buried and fixed (for example, see Patent Document 1).

A center hole (a shaft hole) 3d is formed in the laminated iron core 3 so as to penetrate from one end 3a on the axis line O1 to the other end 3b so that the shaft 2 is fitted by shrink-fitting or press-fitting.

On the other hand, in some IPM-type rotor core 1, as shown in FIG. 14, the permanent magnets 4 may be arranged in a deep V-shape such that the interval in the circumferential direction increases gradually as it advances from the axis line O1 toward the outer side in the radial direction of a pair of adjacent permanent magnets 4 (4a and 4b), and a plurality of pairs of deep V-shaped permanent magnets 4 may be arranged regularly in a circumferential direction. Moreover, a plurality of permanent magnets 4 may be arranged in a radial form by extending the permanent magnets 4 in a radial direction around the axis line O1.

By using the rotor core 1 in which the permanent magnets 4 are arranged in a deep V-shape or a radial form, it is possible to realize a rotor having excellent torque performance.

Patent Document 1: Japanese Unexamined Patent Application, Publication No. H03-036945

SUMMARY OF THE INVENTION

However, in the conventional IPM-type rotor core 1 in which the permanent magnets 4 are arranged in a deep V-shape or a radial form, there is a problem that magnetic flux leakage S may occur between adjacent permanent magnets 4 (4a and 4b) on the inner circumference side (the shaft 2 side) on the inner side in the radial direction around the axis line O1, and a torque-up effect decreases due to the magnetic flux leakage (see FIG. 14). Therefore, it is highly desired to provide a method and means for suppressing magnetic flux leakage in that portion to obtain an excellent torque-up effect.

An embodiment of a rotor structure according to the present disclosure is a rotor structure including: a plurality of rotor cores; a plurality of magnets provided in the rotor cores by being inserted into a plurality of magnet insertion holes formed so as to penetrate in an axis line direction; and a shaft provided integrally with the rotor cores by being inserted into center holes of the rotor cores, wherein the rotor cores include a first rotor core in which a diameter of the center hole is approximately equal to an outer diameter of the shaft and a second rotor core in which a diameter of at least a portion of the center hole is larger than the outer diameter of the shaft and which is arranged so as to be sandwiched between two first rotor cores on the same axis, and a magnet containing material is provided in a gap between an outer circumferential surface of the shaft and an inner circumferential edge of the second rotor core.

An embodiment of a rotor structure manufacturing method according to the present disclosure is a method for manufacturing the rotor structure according to the embodiment, including: forming an injection hole in the first rotor core so as to penetrate from one end in the axis line direction to the other end; attaching the first rotor core and the second rotor core to the shaft; and injecting the magnet containing material from the injection hole to fill the gap.

In the embodiment, since the magnet containing material is provided in a portion between the shaft and the adjacent magnets of the second rotor core where magnetic flux leakage is most likely to occur, it is possible to suppress magnetic flux leakage. Due to this, it is possible to realize a rotor structure exhibiting a torque performance (a torque-up effect) better than the conventional rotor structure.

Furthermore, since the magnet containing material is provided in a portion between the shaft and the adjacent magnets of the second rotor core where magnetic flux leakage is most likely to occur, it is possible to increase the amount of magnet and to realize a rotor structure exhibiting a better torque performance.

DETAILED DESCRIPTION OF THE INVENTION

Hereinafter, with reference to FIGS. 1 to 12, a rotor structure and a rotor structure manufacturing method according to an embodiment of the present invention will be described.

Figure 1:
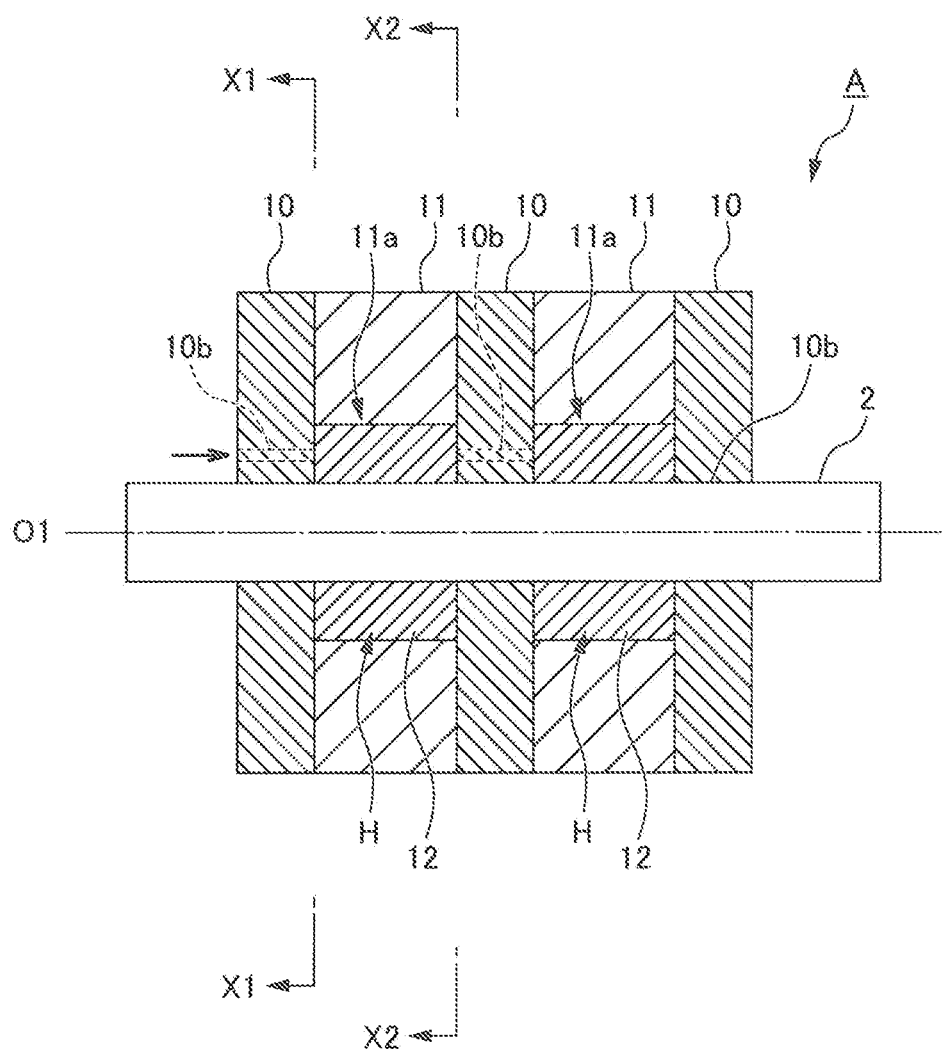
FIG. 1 is a cross-sectional view showing a rotor (a rotor structure) according to an embodiment.
Figure 2:
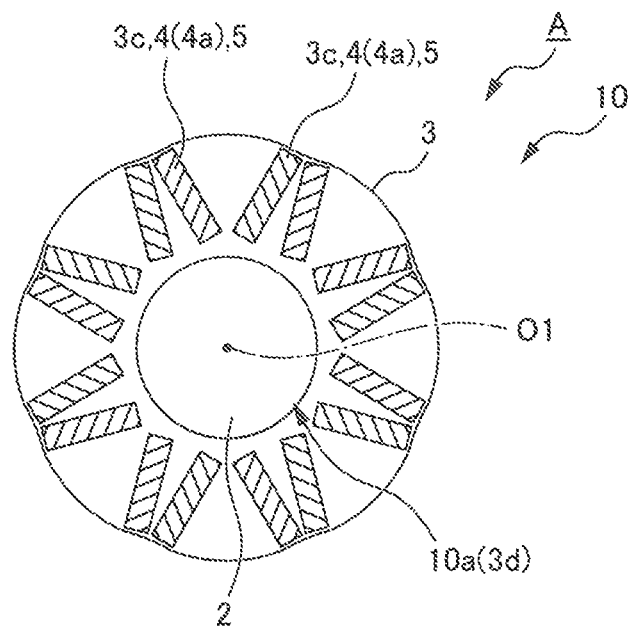
FIG. 2 is a view taken along arrow X1-X1 in FIG. 1 and is a view showing a rotor (a rotor structure) and a first rotor core (an IPM-type rotor core) according to an embodiment.
Figure 3:
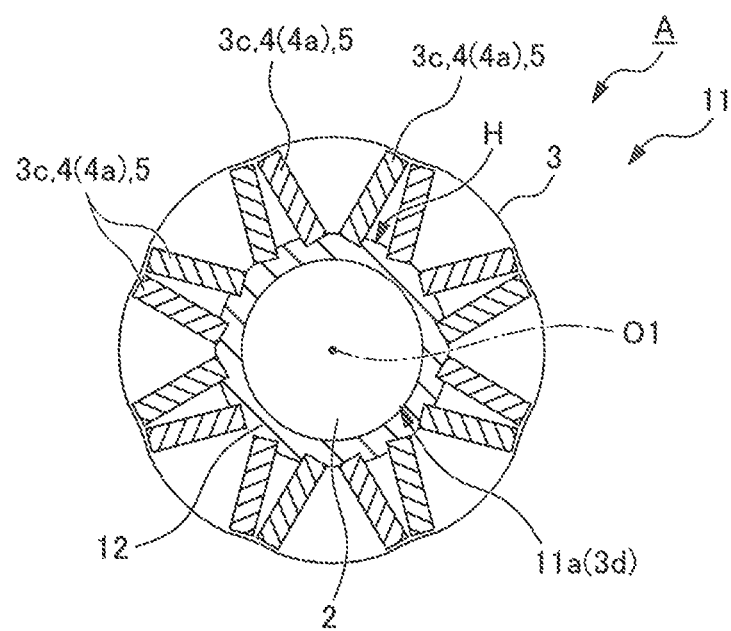
FIG. 3 is a view taken along arrow X2-X2 in FIG. 1 and is a view showing a rotor (a rotor structure) and a second rotor core (an IPM-type rotor core) according to an embodiment.
Figure 4:
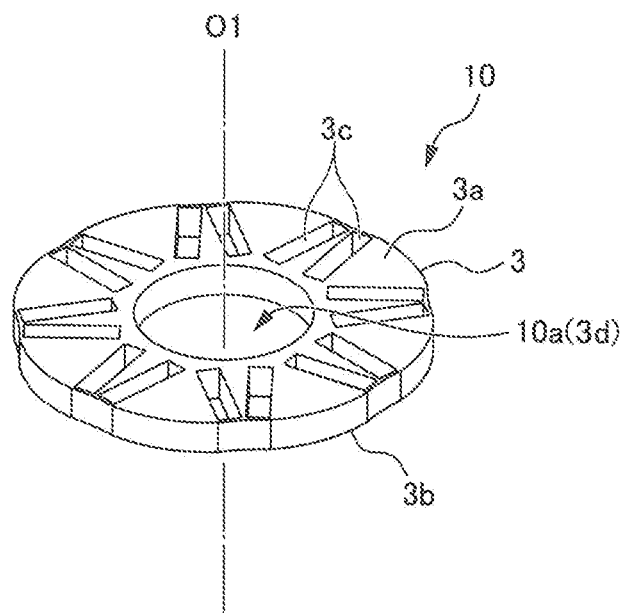
FIG. 4 is a perspective view showing a first rotor core (an IPM-type rotor core) according to an embodiment.
Figure 5:
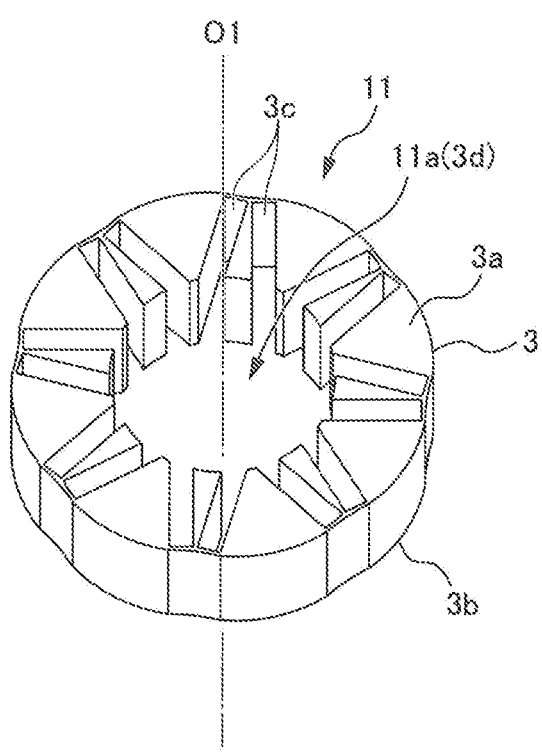
FIG. 5 is a perspective view showing a second rotor core (an IPM-type rotor core) according to an embodiment.

A rotor (a rotor structure) A of the present embodiment is a rotor of an electric rotating machine such as a motor of an automobile or an electric appliance and is formed by integrally assembling a plurality of IPM-type rotor cores 10 and 11 in the direction of an axis line O1 while inserting a shaft 2 into center holes (shaft holes) 10a and 11a of the rotor core 1 as shown in FIGS. 1, 2, and 3.

The IPM-type rotor cores 10 and 11 of the present embodiment include, for example, a laminated iron core 3 obtained by laminating a plurality of core members (thin sheet-shaped members) formed by punching an electromagnetic steel sheet, a permanent magnet 4 inserted and accommodated in a magnet insertion hole 3c formed so as to penetrate from one end 3a in the direction of the axis line O1 of the laminated iron core 3 to the other end 3b, and a resin material 5 injected into the magnet insertion hole 3c so that the permanent magnet 4 is buried and fixed as shown in FIGS. 2 and 4 and FIGS. 3 and 5.

A center hole (a shaft hole) 3d is formed in the laminated iron core 3 so as to penetrate from one end 3a on the axis line O1 to the other end 3b so that the shaft is inserted therethrough.

As shown in FIGS. 2 and 3, in the IPM-type rotor cores 10 and 11 of the present embodiment, the permanent magnets 4 are arranged in a deep V-shape such that the interval in the circumferential direction increases gradually as it advances from the axis line O1 toward the outer side in the radial direction of a pair of adjacent permanent magnets 4 (4a and 4b), and a plurality of pairs of deep V-shaped permanent magnets 4 (4a and 4b) are arranged regularly in a circumferential direction.

Furthermore, as shown in FIGS. 1, 2, and 3, the rotor A of the present embodiment uses two types of rotor cores including an ordinary shaft-attachment first rotor core (an IPM-type rotor core) 10 in which an inner diameter of the center hole 10a is approximately equal to an outer diameter of the shaft 2, and the rotor core is integrally attached at a predetermined position of the shaft 2 by shrink-fitting or press-fitting while being inserted into the center hole 10a and a magnetic flux leakage-preventive second rotor core (an IPM-type rotor core) 11 in which the inner diameter of the center hole 11a is larger than the outer diameter of the shaft 2.

Specifically, the second rotor cores 11 is arranged so as to be sandwiched between two first rotor cores 10 and is provided so as to be integrally assembled with adjacent first rotor cores 10 with the respective axis lines O1 disposed on the same axis by fitting pins and pin holes formed in the respective rotor cores 10 and 11 together, for example. In this way, the second rotor core 11 sandwiched between two first rotor cores 10 is supported by the two first rotor cores 10, and an inner circumferential edge that forms the center hole 11a is separated from the outer diameter of the shaft 2 to form a gap H between the shaft 2 and the inner circumferential edge of the second rotor core 11.

A magnet containing material 12 is provided in the gap H between the shaft 2 and the inner circumferential edge of the second rotor core 11 so as to bury the gap H. That is, the rotor A of the present embodiment is configured such that the magnet containing material 12 is disposed between the shaft 2 and the second rotor core 11.

The magnet containing material 12 is a bond magnet in which a powdery (or granular) magnet is mixed and dispersed in a resin material or a rubber material and is injected and filled in the gap H between the shaft 2 and the inner circumferential edge of the second rotor core 11. The magnet containing material 12 is solidified and cured so that desired pliability, elasticity, and flexibility are obtained and is disposed between the shaft 2 and the second rotor core 11. The first rotor core 10 and the second rotor core 11 have substantially the same configuration except the diameter dimensions of the center holes 10a and 11a.

As a method (a rotor structure manufacturing method of the present embodiment) of injecting and filling the magnet containing material 12 in which a powdery (or granular) magnet is mixed and dispersed in a resin material or rubber material in the gap H between the shaft 2 and the inner circumferential edge of the second rotor core 11, for example, as shown in FIG. 1, an injection hole 10b that penetrates from one end of the first rotor core 10 to the other end is formed in advance. After the first rotor core 10 and the second rotor core 11 are provided in a state in which the shaft 2 is inserted into the center holes 10a and 11a and the rotor cores are assembled at a predetermined position, a non-cured magnet containing material 12 is injected and filled in the gap H between the shaft 2 and the inner circumferential edge of the second rotor core 11 from the injection hole 10b of the first rotor core 10. After a predetermined period has elapsed, the magnet containing material 12 filled in the injection hole 10b and the gap H between the shaft 2 and the second rotor core 11 is solidified and cured and has desired pliability, elasticity, and flexibility. In this way, the magnet containing material 12 can be filled and disposed ideally in the gap H between the shaft 2 and the second rotor core 11, and the rotor A of the present embodiment having the magnet containing material 12 can be obtained.

Here, in the rotor A of the present embodiment, even if the second rotor core 11 is not strongly connected to the shaft 2, the first rotor core 10 is strongly connected to the shaft 2 by shrink-fitting or press-fitting, and the second rotor core 11 is provided integrally between the adjacent first rotor cores 10. Moreover, the magnet containing material 12 is filled in the gap H between the shaft 2 and the second rotor core 11. Due to this, rotor inertia is secured (improved) and rigidity of the rotor A itself is secured (improved). Moreover, since a plurality of first rotor cores 10 are arranged evenly in the direction of the axis line O1, rotor inertia can be secured (improved) more reliably, and rigidity of the rotor A itself can be secured (improved) more reliably.

For example, the first rotor core 10 and the second rotor core 11 adjacent to each other may be handled as one set, the first rotor core 10 of each set may be attached to the shaft 2 by shrink-fitting or press-fitting, and the second rotor core 11 may be attached to the first rotor core 10. After that, the magnet containing material 12 may be filled in the gap H between the shaft 2 and the second rotor core 11, and in a similar manner, a plurality of sets of first rotor cores 10 and second rotor cores 11 may be attached sequentially to the rotor A.

Furthermore, although the magnet containing material 12 may be a hardened member such as a Nd magnet, in this case, the Nd magnet shrinks when heated whereas the shaft 2 made from iron expands, and damage such as crack may occur in the magnet containing material 12. Due to this, the magnet containing material 12 preferably has solidifying/hardening strength in which cracks or the like rarely occur when the rotor A was used. In other words, the magnet containing material 12 preferably has pliability, elasticity, and flexibility in which cracks or the like rarely occur when the rotor A was used. In this respect, it is ideal to use a bond magnet.

A magnet containing material 12 which is a molding obtained by mixing and dispersing a powdery magnet in a resin material or the like and curing (solidifying) the same may be prepared in advance, and when the shaft 2 is inserted into the center holes 10a and 11a of the first rotor core 10 and the second rotor core 11, the magnet containing material 12 may be provided in the gap H between the shaft 2 and the second rotor core 11 to manufacture the rotor A.

In the rotor A of the present embodiment having the above-described configuration, since the magnet containing material 12 is disposed between the shaft 2 and a portion (a trough portion of a pair of deep V-shaped permanent magnets 4 (4a and 4b)) where magnetic flux leakage occurs on the inner side in the radial direction of the adjacent permanent magnets 4 of the second rotor core 11, leakage (magnetic flux leakage S) of a magnetic field of the permanent magnet 4 of the magnet containing material 12 from the trough portion of the pair of permanent magnets 4 (4a and 4b) toward the shaft 2 can be suppressed.

Figure 6:
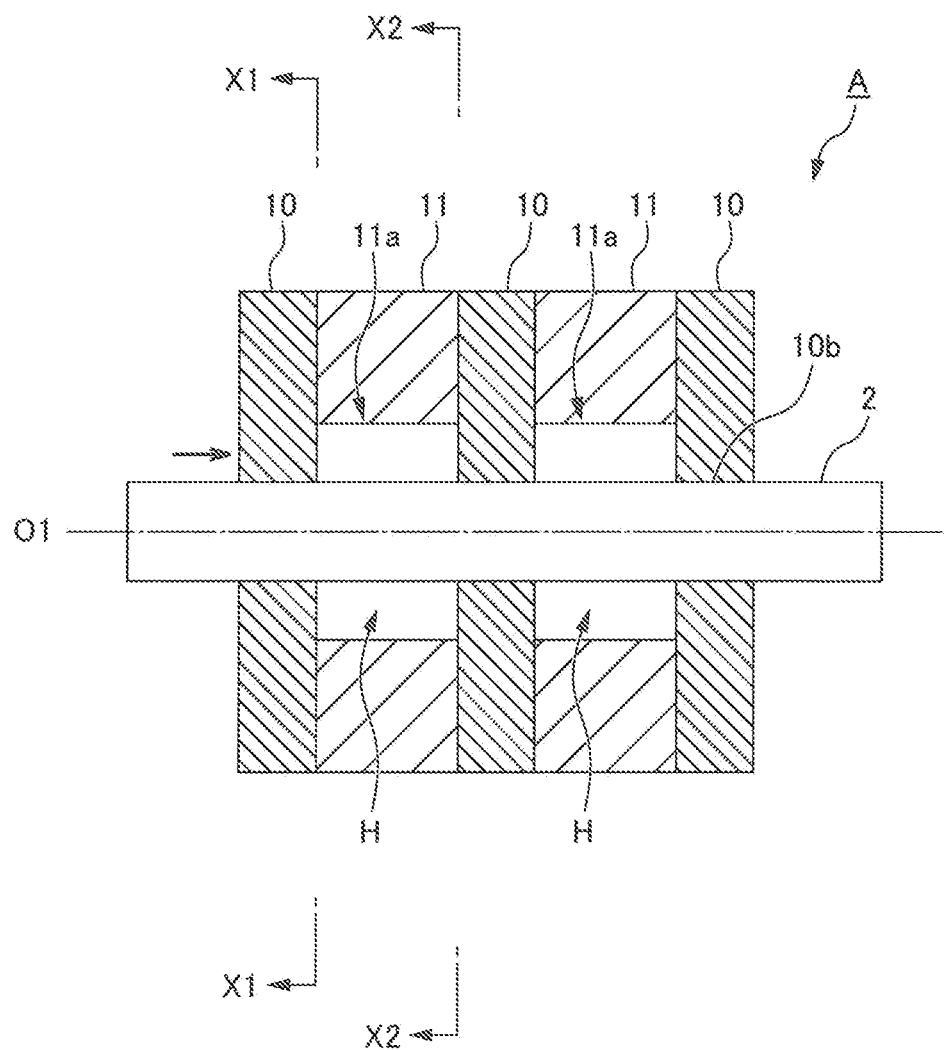
FIG. 6 is a cross-sectional view showing a rotor (a rotor structure).
Figure 7:
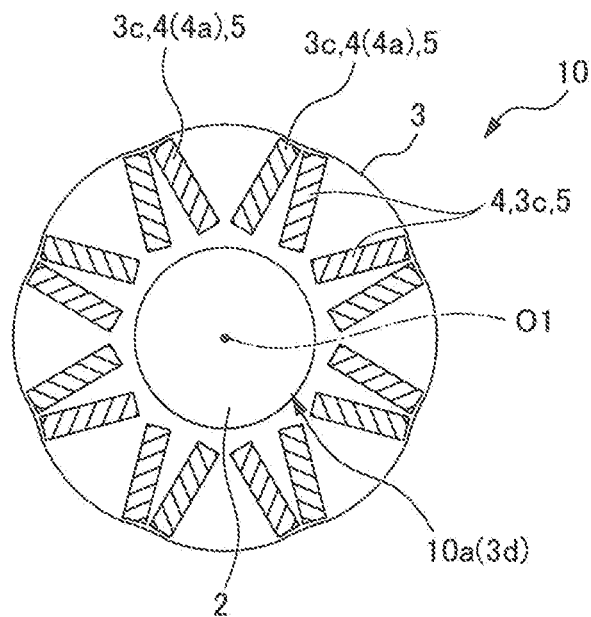
FIG. 7 is a view taken along arrow X1-X1 in FIG. 6.
Figure 8:
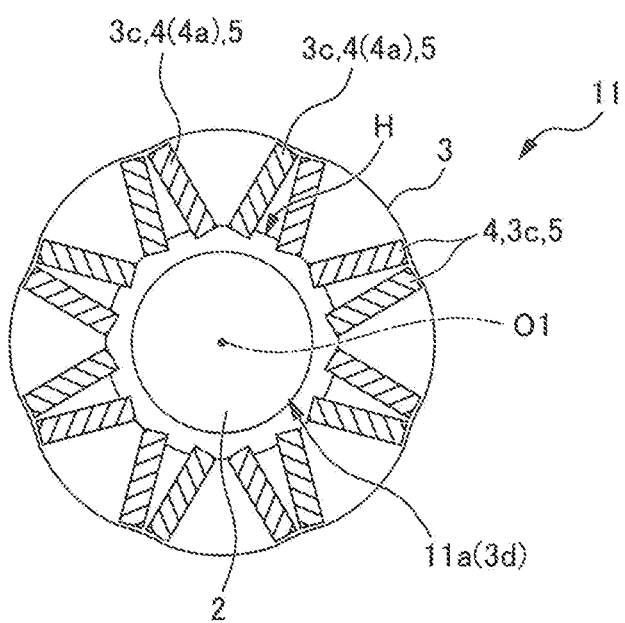
FIG. 8 is a view taken along arrow X2-X2 in FIG. 6.
Figure 9:
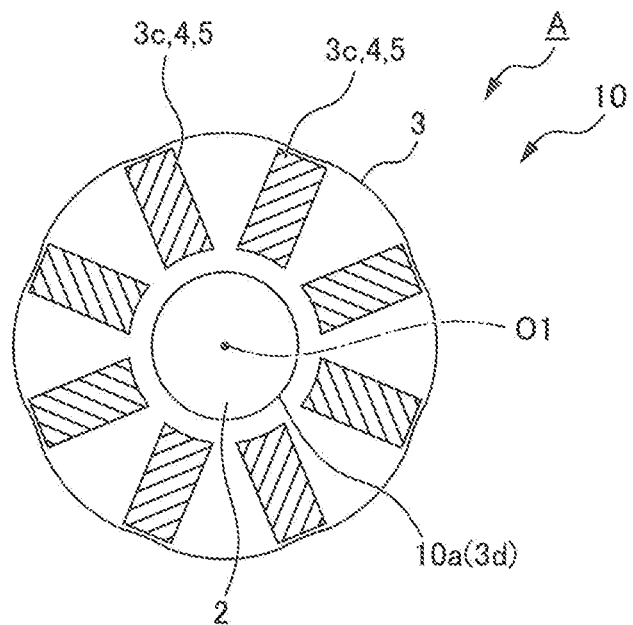
FIG. 9 is a diagram showing a modification of a rotor (a rotor structure) and a first rotor core (an IPM-type rotor core) according to an embodiment.
Figure 10:
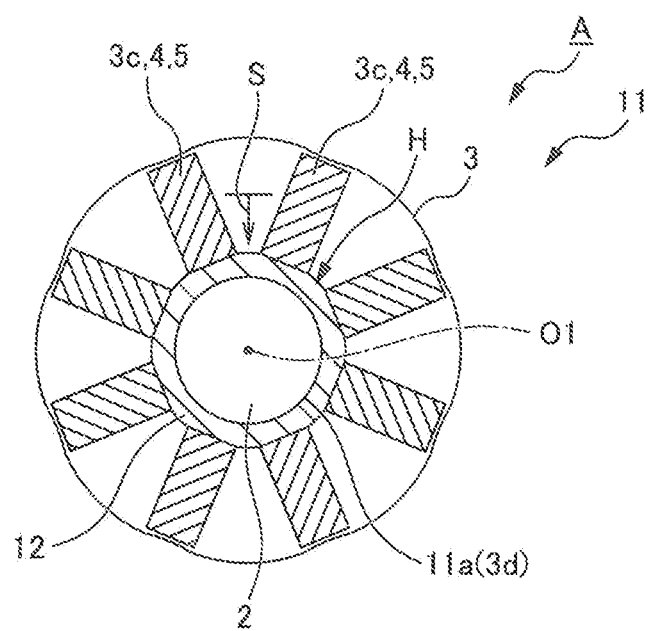
FIG. 10 is a diagram showing a modification of a rotor (a rotor structure) and a second rotor core (an IPM-type rotor core) according to an embodiment.
Figure 11:
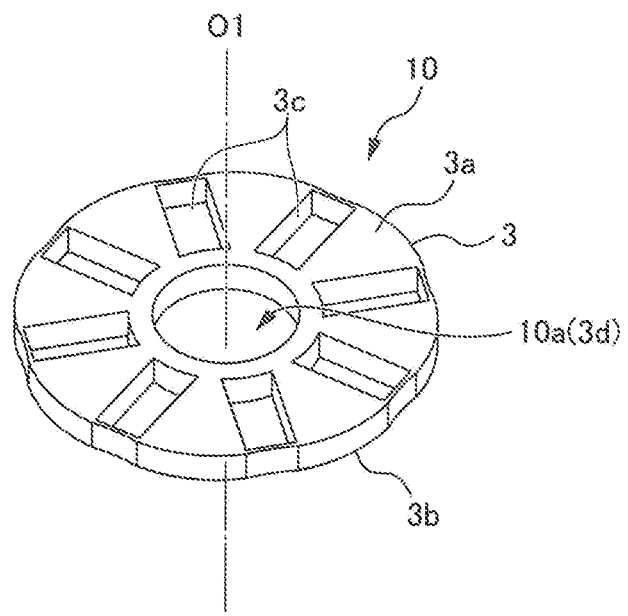
FIG. 11 is a perspective view showing a modification of a first rotor core (an IPM-type rotor core) according to an embodiment.
Figure 12:
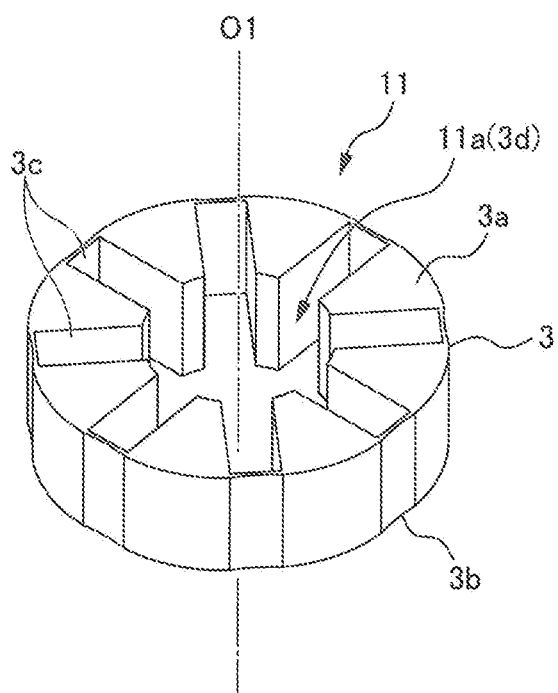
FIG. 12 is a perspective view showing a modification of a second rotor core (an IPM-type rotor core) according to an embodiment.
Figure 13:
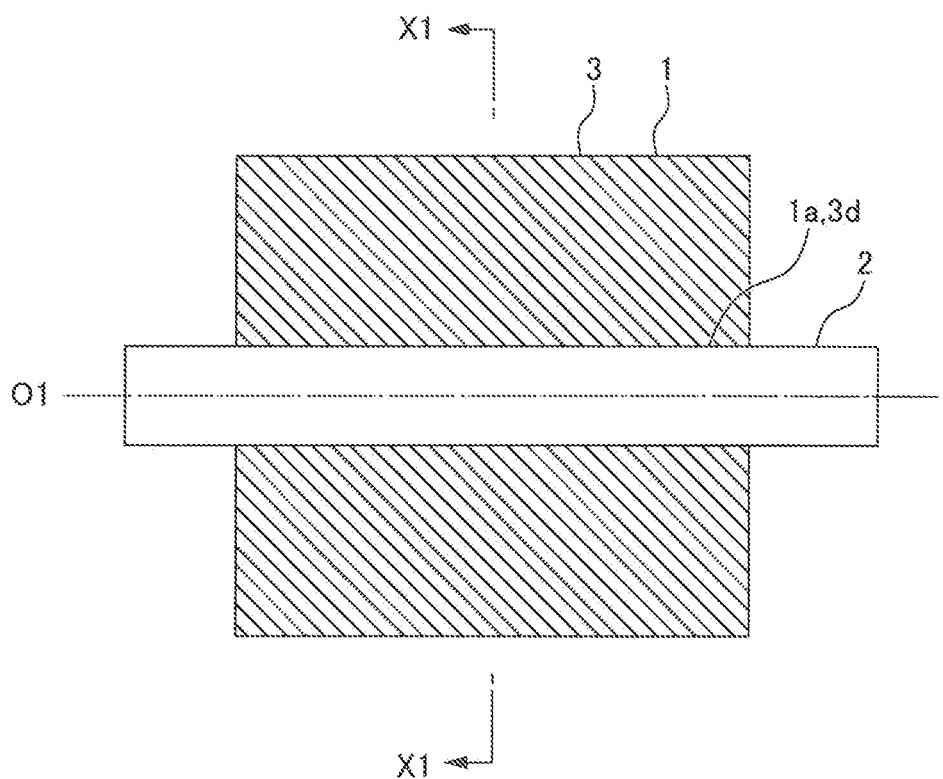
FIG. 13 is a cross-sectional view showing a conventional rotor (a rotor structure).
Figure 14:
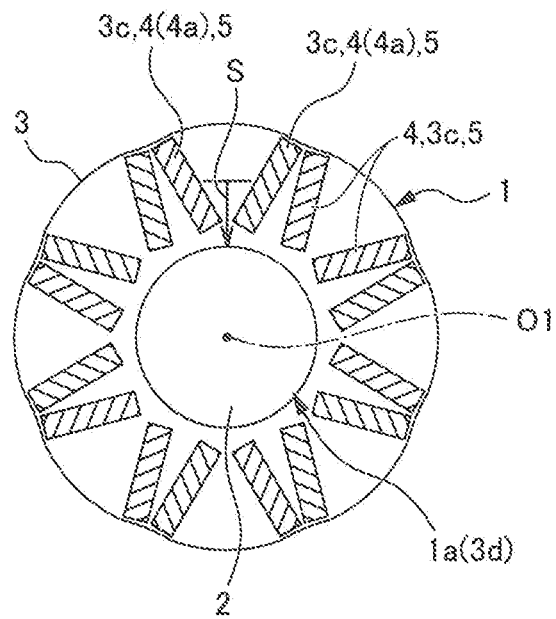
FIG. 14 is a view taken along arrow X1-X1 in FIG. 13.
Figure 15:
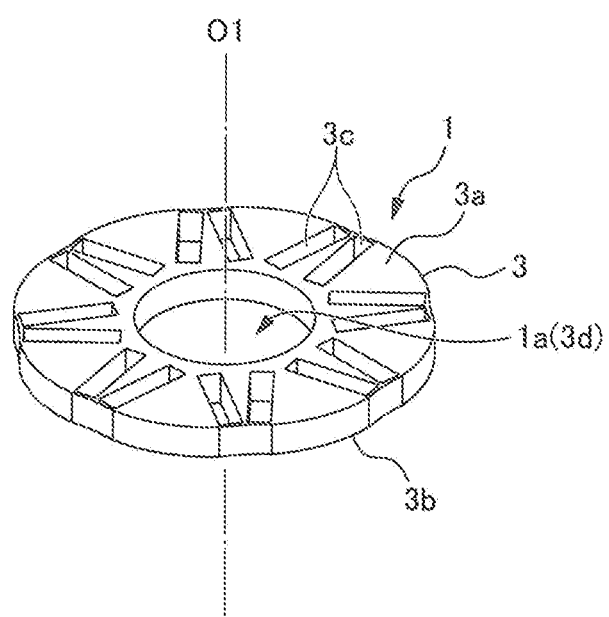
FIG. 15 is a perspective view showing a conventional rotor core (an IPM-type rotor core).

On the other hand, as shown in FIGS. 6 to 8, even when the gap H between the shaft 2 and the second rotor core 11 is left as a void without providing the magnet containing material 12 in the gap H between the shaft 2 and the second rotor core 11, it is possible to suppress the magnetic flux leakage S.

However, as in the rotor A of the present embodiment, when the magnet containing material 12 is provided in the gap H between the shaft 2 and the second rotor core 11, since it is possible to utilize the magnetic force of the magnet containing material 12 as well as suppressing the magnetic flux leakage S (that is, the magnet of the magnet containing material 12 also contributes to torque), it is possible to achieve torque-up of the rotor A.

Furthermore, by providing the magnet containing material 12 in the gap H between the shaft 2 and the second rotor core 11, it is possible to increase the rotor inertia and the rigidity of the rotor A itself. Therefore, it is possible to improve the control performance of an electric rotating machine such as a motor including the rotor A of the present embodiment.

Furthermore, since the first rotor core 10 and the second rotor core 11 are arranged alternately in the direction of the axis line O1, particularly, since the first rotor cores 10 are arranged evenly in the direction of the axis line O1, it is possible to obtain an excellent torque-up effect due to the magnet containing material 12 while securing desired coupling strength of coupling the rotor cores 10 and 11 to the shaft 2.

Therefore, in the rotor structure A (and the rotor structure manufacturing method) of the present embodiment, since the magnet containing material 12 is provided in a portion where the magnetic flux leakage S is most likely to occur between the shaft 2 and a pair of adjacent permanent magnets 4 (4a and 4b) of the second rotor core 11, it is possible to realize the rotor A exhibiting a torque performance (a torque-up effect) better than the conventional rotor.

While an embodiment of the rotor structure and the rotor structure manufacturing method according to the present invention has been described, the present invention is not limited to the embodiment but can be modified appropriately without departing from the spirit thereof.

For example, although in the present embodiment, the first rotor core 10 and the second rotor core 11 are arranged alternately in the direction of the axis line O1, as long as the second rotor core 11 is arranged so as to be sandwiched between two first rotor cores 10, for example, two first rotor cores 10 in another portion may be assembled adjacent to each other, and the rotor A may not necessarily be configured as in FIG. 1.

Furthermore, although in the present embodiment, a plurality of pairs of deep V-shaped permanent magnets 4 (4a and 4b) are arranged regularly in the circumferential direction to form the rotor cores 10 and 11 and the rotor structure A, as shown in FIGS. 9 to 12, a plurality of permanent magnets 4 may be arranged in a radial form by extending the same in a radial direction around the axis line O1 to form the rotor cores 10 and 11 and the rotor structure A.

When the magnet containing material 12 is provided as in the present embodiment in the rotor structure A including the rotor cores 10 and 11 in which the permanent magnets 4 are arranged in a radial form, it is possible to suppress occurrence of the magnetic flux leakage S between the permanent magnets 4 adjacent in the circumferential direction more effectively and to obtain a further excellent torque-up effect.

Furthermore, although in the present embodiment, the gap H is formed in a ring form in the entire circumferential direction around the axis line O1 and the magnet containing material 12 is provided in a ring form, the gap H may be provided in a local area between the shaft 2 and the trough portion of a pair of deep V-shaped permanent magnets 4 (4a and 4b) where the magnetic flux leakage S is likely to occur and between the shaft-side portions of a pair of adjacent permanent magnets 4 arranged in a radial form, and the magnet containing material 12 may be provided in the gap H provided in the local area in the circumferential direction around the axis line O1. In this case, the same advantages as those of the present embodiment can be obtained.

EXPLANATION OF REFERENCE NUMERALS

2: Shaft
3: Laminated iron core
3c: Magnet insertion hole
3d: Center hole (Shaft hole)
4: Permanent magnet
5: Resin material
10: First rotor core
10a: Center hole (Shaft hole)
11: Second rotor core
11a: Center hole (Shaft hole)
12: Magnet containing material
A: Rotor (Rotor structure)
H: Gap
O1: Axis line
S: Magnetic flux leakage

What is claimed is:

1. A rotor structure comprising: a plurality of rotor cores; a plurality of magnets provided in the rotor cores by being inserted into a plurality of magnet insertion holes formed so as to penetrate in an axis line direction; and a shaft provided integrally with the rotor cores by being inserted into center holes of the rotor cores, wherein
   the rotor cores include a first rotor core in which a diameter of the center hole is approximately equal to an outer diameter of the shaft and a second rotor core in which a diameter of at least a portion of the center hole is larger than an outer diameter of the shaft and which is arranged so as to be sandwiched between two of the first rotor cores on the same axis, and
   a material including a magnet is provided in a gap between an outer circumferential surface of the shaft and an inner circumferential edge of the second rotor core.

2. The rotor structure according to claim 1, wherein the plurality of magnets are arranged in the rotor core in a radial form at a predetermined interval in a circumferential direction around the axis line so as to extend in a radial direction around the axis line, and
   the material including the magnet is provided between at least a pair of magnets adjacent in the circumferential direction and the shaft in the radial direction.

3. The rotor structure according to claim 1, wherein the material including the magnet is provided in a ring form in an entire circumferential direction around the axis line.

4. A method for manufacturing the rotor structure according to claim 1, comprising:
   forming an injection hole in the first rotor core so as to penetrate from one end in the axis line direction to the other end; attaching the first rotor core and the second rotor core to the shaft;
   and injecting the material including the magnet from the injection hole to fill the gap.

5. The rotor structure according to claim 1, wherein the material including the magnet entirely fills the gap.

6. A rotor structure comprising: a plurality of rotor cores; a plurality of magnets provided in the rotor cores by being inserted into a plurality of magnet insertion holes formed so as to penetrate in an axis line direction; and a shaft provided integrally with the rotor cores by being inserted into center holes of the rotor cores, wherein
   the rotor cores include a first rotor core in which a diameter of the center hole is approximately equal to an outer diameter of the shaft and a second rotor core in which a diameter of at least a portion of the center hole is larger than an outer diameter of the shaft and which is arranged so as to be sandwiched between two of the first rotor cores on the same axis,
   a magnet containing material is provided in a gap between an outer circumferential surface of the shaft and an inner circumferential edge of the second rotor core, and
   a pair of magnets adjacent in a circumferential direction around the axis line is arranged in the rotor core so as to have such an approximately V-shape that an inner side in a radial direction around the axis line is a trough portion, and a plurality of pairs of approximately V-shaped magnets are arranged regularly in the circumferential direction, and
   the magnet containing material is provided between at least a trough portion of a pair of approximately V-shaped magnets and the shaft in the radial direction.

7. A rotor structure comprising: a plurality of rotor cores; a plurality of magnets provided in the rotor cores by being inserted into a plurality of magnet insertion holes formed so as to penetrate in an axis line direction; and a shaft provided integrally with the rotor cores by being inserted into center holes of the rotor cores, wherein
   the rotor cores include a first rotor core in which a diameter of the center hole is approximately equal to an outer diameter of the shaft and a second rotor core in which a diameter of at least a portion of the center hole is larger than an outer diameter of the shaft and which is arranged so as to be sandwiched between two of the first rotor cores on the same axis,
   a magnet containing material is provided in a gap between an outer circumferential surface of the shaft and an inner circumferential edge of the second rotor core, and
   the magnet containing material is a bond magnet obtained by mixing a powdery or granular magnet and a resin material or a rubber material.

* * * * *